INVENTORS:
Robert B. Jacobs
BY  Cecil E. Williams

Everett A. Johnson
ATTORNEY

Feb. 26, 1957 R. B. JACOBS ET AL 2,782,628
CONTINUOUS VOLATILITY DETERMINATION
Filed July 15, 1953 4 Sheets-Sheet 4

INVENTORS:
Robert B. Jacobs
BY Cecil E. Williams

Everett A. Johnson
ATTORNEY

United States Patent Office 2,782,628
Patented Feb. 26, 1957

2,782,628
CONTINUOUS VOLATILITY DETERMINATION

Robert B. Jacobs, Homewood, and Cecil E. Williams, Chicago, Ill., assignors to Standard Oil Company, Chicago, Ill., a corporation of Indiana Application July 15, 1953, Serial No. 368,184

8 Claims. (Cl. 73—53)

This invention relates to an improved apparatus and method for automatically determining the volatility characteristics of liquids. It has particular reference to apparatus that will automatically and continuously determine the vapor pressure of a liquid and will indicate or record the vapor pressure or will control other apparatus or methods in response thereto.

It has been proposed that the vapor pressure of liquids be determined automatically by withdrawing a sample continuously from a source of liquid and thereafter measuring the pressure exerted by the vapor of the liquid at a controlled constant temperature. However, considerable difficulty has been encountered in the devices of this type primarily because they permit the accumulation of fixed gases within the apparatus, and, therefore, the determinations soon become invalid because a large part of the measured pressure is that of the said accumulated gases.

The primary object of the present invention is the provision of improvements in apparatus and method for determining the vapor pressure of liquids both continuously and automatically.

Another object of the invention is the provision of an improved continuous vapor pressure determining apparatus whereby the problem which has previously existed of the accumulation of fixed gases in the said apparatus is substantially entirely eliminated.

A further object of the invention is the provision of a continuous vapor pressure determining apparatus that cooperatively determines the content and nature of low boiling product in the sampled liquid. The invention has for further objects such other advantages or results as will appear in the specification and the claims hereinafter made.

Briefly stated, the present invention comprises an apparatus and method for determining the vapor pressure of liquids including a chamber or enclosed vessel having an upper vapor zone and a lower liquid-containing zone and that is maintained at a substantially constant temperature usually by immersion of the chamber in a constant temperature bath, a conduit or feed tube connected from a source of liquid for discharge into the said chamber whereby a uniform flow can be established and preferably having a section of heat exchange tube immersed in the said bath so that the introduced liquid can be heated to substantially constant temperature, a liquid-outlet from the chamber having a leveling device comprising a float valve, to maintain a substantially fixed liquid level within the chamber, a pressure-sensitive device or gauge operatively connected to the chamber, and a vapor outlet from the chamber which consists of a restricted passage comprising a capillary tube, that is of such length, cross section and overall impedance to the flow of vapors therethrough that a restricted continuous withdrawal of a minor volume of vapors and particularly of inert gases is accomplished from the said chamber so that the aforementioned accumulation of said inert gases can be avoided. Preferably, a heat exchange tube immersed in the constant temperature bath and of adjusted length is provided between the sample feed line and the chamber to heat the inflowing liquid sample to a substantially constant temperature selected in each case so that the liquids being tested will exert a vapor pressure greater than the pressure, usually atmospheric, at the outlet of the said restricted passage and so that none will be heated above its critical temperature. Flow through the apparatus can be provided by any means for maintaining an outlet pressure less than the inlet pressure.

Although the preferred embodiment hereinafter described employs a system under positive pressure, a vacuum system can be used, in which case the said gauge that is operatively connected to the vapor chamber can be a vacuum gauge and the outlet capillary tube can be connected to a vacuum pump. When a vacuum system is employed, the vapor pressure of the liquid in the chamber will effect a proportionate reduction in the vacuum that is measured on the gauge.

The hereinafter described apparatus of the invention is particularly useful in several industrial processes. For example, the precentage of alcohol in water or of any component of the miscible binary system where the one component is of substantially different vapor pressure than the other can readily be determined by the aforesaid apparatus as will be demonstrated in a specific example hereinafter given. The nature of the liquid in a petroleum products pipeline, for example, whether the liquid be a gasoline or a diesel fuel or kerosene, can be indicated by an apparatus of the type described that is attached to a petroleum products pipeline and a change in the product being transported therein will be rapidly indicated on the gauge chart of the described apparatus. The pressure-responsive means of the described apparatus can in turn be so connected as to operate suitable relays and automatically operable valves so that storage tanks at petroleum bulk stations can be filled with the proper product completely automatically and in response to a determination of the vapor pressure of the product being transported.

A further and improved application of the present invention is the provision of a continuously indicating aid in the blending of gasoline. Gasoline is now marketed under specifications based on the Reid method for vapor-pressure determination (ASTM D 323–42), which was originally devised in 1930. This method employs an apparatus comprising an air chamber, a Bourdon-type pressure gauge, and a liquid sample chamber. The air chamber has fixed dimensions and openings designed to permit complete drainage of the chamber. The liquid sample chamber has the same inside diameter as the air chamber and a length sufficient to provide an overall vapor-to-liquid ratio of 3.8 to 4.2 when attached to the air chamber. In determining vapor pressure with this apparatus, the sample liquid, having first been saturated with water and chilled, is introduced into the sample chamber and the sample chamber is screwed into air chamber. The assembled apparatus is shaken vigorously and immersed in a water bath maintained at a constant temperature (for gasoline, 100 plus or minus 0.2° F.) until the pressure reaches equilibrium.

The foregoing method provides reasonably accurate results, although it is subject to the usual human errors of manipulation. However, it is comparatively slow procedure, requiring around a half hour or more for each determination, even when carried out by a skilled operator. Moreover, special facilities must be provided for taking samples of the gasoline stream, and the samples must be refrigerated until such time as the vapor-pressure determination can be made. From the point of view of the refiner, however, the most serious drawback of the method is its failure to provide information on the basis of which the blending operation itself can be satisfactorily regulated. In ordinary blending operations, as much as 5,000 barrels of gasoline per day may be produced, during which time the composition of the streams being blended may alter materially, thus influencing the properties of the product. If the operator must wait a half hour or longer after any change in the operating conditions before he can determine the effect of the change on the product, he obviously may be unable to prevent the occurrence of substantial deviations from the prescribed range of vapor pressure.

Efforts have been made to devise equipment for measuring the so-called "true vapor pressure" of the blended gasoline by continuously passing a side-stream of the blend into an evaporating cup, and measuring the pressure developed therein. This technique can be employed successfully for measuring the vapor pressure of a liquid which contains no dissolved non-condensible gases; however, virtually all gasoline streams contain dissolved air and lower hydrocarbons, which come out of solution and accumulate in the evaporating cup, eventually rendering the device completely inoperative. For this reason, such vapor pressure apparatus has not proved successful in the regulation of gasoline-blending operations.

Our invention will be described in greater detail with respect to the accompanying drawings wherein.

Figure 1:
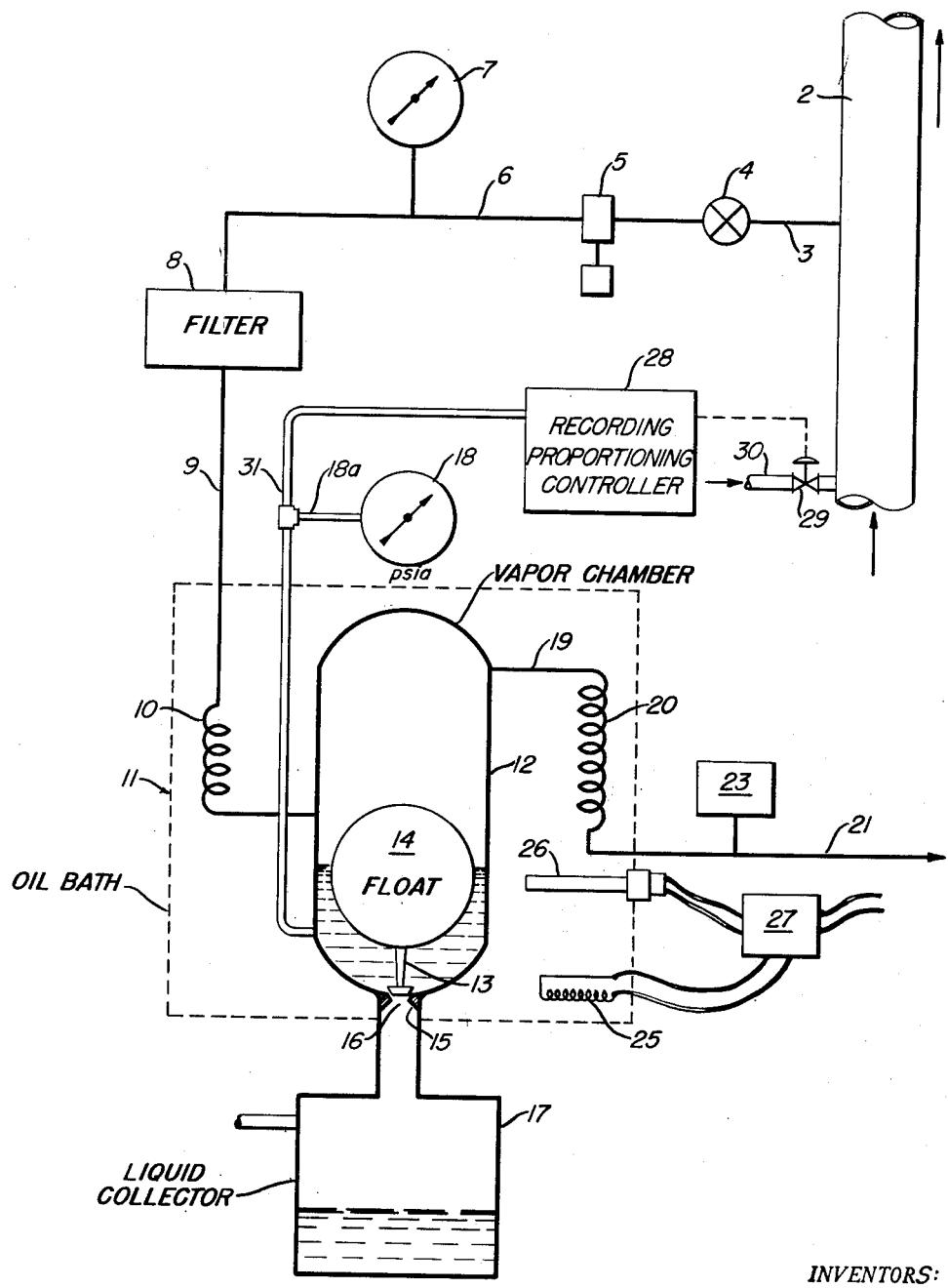
Figure 1 is a diagrammatic sketch of an automatic vapor pressure apparatus according to the invention.

Referring now to Figure 1, a gasoline blend line 2 is tapped by a sample line 3 in which is disposed a valve 4. Withdrawn liquid is pumped at a uniform rate by proportioning pump 5 through the vapor-pressure apparatus. The sample then flows from the said pump 5 through sample line 6, to which is attached a pressure gauge 7, into a filter 8 whereby any dirt, rust or other foreign material is removed from the sample. The filtered gasoline flows through a line 9, in which is disposed a capillary tube 10 which improves operation by restricting and making the flow of the sample feed more uniform.

The tube 10 is immersed in a controlled temperature oil bath 11 and the sampled liquid is caused to flow slowly therethrough at a rate of about 60 cc. per minute. In so doing, it is raised to a temperature in substantial equilibrium with the temperature of the oil bath 11. The preheater tube 10 has an inside diameter sufficiently small to minimize any tendency for separation of vapor and liquid during the preheating of the liquid sample and has a length sufficient to bring the sample to the desired temperature. For example, the preheater tube having an inside diameter of between about 0.05 inch and 0.2 inch and a length of between about 4 feet and 10 feet is satisfactory. A preferred tube has an inside diameter of about 0.06 inch and a length of about 8 feet.

We can operate with an oil bath temperature in the range of between about 135° and 145° F. since these temperatures are high enough to insure that the vapor pressure of the liquid within the chamber will always be above atmospheric pressure for gasolines having a Reid Vapor Pressure above about 7 pounds. However, we prefer to use a temperature of about 140° F. since at that temperature the effect of the composition of the blends on the chamber pressure is minimized under our operating conditions of sample introduction and vapor venting rate. Further, the correlation between chamber pressure and Reid Vapor Pressure is best for gasolines at this preferred temperature of about 140° F.

Any means for controlling the bath temperature may be used. However, one means for effecting such control is to provide an insulated vessel 24 having a coil heater 25 which is controlled by means of a thermoswitch 26 that is also immersed in the bath 11. The thermoswitch 26 is connected to a suitable relay 27 whereby current is intermittently supplied to the heater 25 in response to changes in temperature of the bath 11 as determined by the thermoswitch 26.

The filtered sample flows as a liquid from the capillary 10 into a liquid sample chamber 12. A constant level of sample liquid is maintained in the float chamber 12 by a float valve 13 consisting of a float device 14 and seat 15 which is integrally fitted about outlet orifice 16 in the bottom of chamber 12. Released liquids can be drained to a sump or a waste liquid collector 17 as shown. To the chamber 12 is operatively attached a pressure gauge 18 that is so disposed as to measure the pressure within the said chamber 12. The gauge 18 is preferably attached to the lower, or liquid zone, of the chamber or vessel 12. In addition to the gauge 18, we provide a recorder-controller 28 for recording the pressure with time and for controlling a blending valve 29 on line 30 so as to maintain a blended liquid composition in line 2 which meets the desired Reid Vapor Pressure specification.

Attached at the upper end of the float chamber 12 is an outlet vapor line 19 which includes a capillary tube 20 that restricts the flow of vapors from the said chamber 12. The outlet vapor line 19 and the capillary 20 are also immersed in the said controlled-temperature oil bath 11 and released vapors flow from the said capillary 20 through a line 21 to atmosphere.

In one example, the outlet capillary 20 was a tube about 125 feet long having a 0.03 inch inside diameter. Reasonable variations in the length and diameter of the outlet capillary will adapt the instrument to the determination of vapor pressure of many different liquids.

The inside diameter and length of the capillary 20 is chosen so that the venting of vapors is comparable with the amount of vapor displacement in the standard Reid bomb test and sufficiently large to ensure that no foreign gases accumulate in the chamber. Thus, there is no substantial stripping of the sample during the test. For example, in the standard Reid test the ratio of the volume of vapors (measured at standard conditions) in the Reid chamber, to the volume of the liquid introduced, for a gasoline with a 9 pound Reid Vapor Pressure is about 2:1 and for a gasoline with a Reid Vapor Pressure of 15 pounds is about 4:1. In our instrument the ratio of the volume of vapors escaping through the capillary vent (measured at standard conditions), to the volume of liquid introduced into the chamber for a gasoline with a 9 pound Reid Vapor Pressure is about 1:1, and for a gasoline with a 15 pound Reid Vapor Pressure about 2:1.

These capillaries are selected so that they will allow the escape of 190 cc. per minute of nitrogen (measured at standard conditions) when a pressure differential of 35 pounds exists across the tube at 20° C. Experiments indicate that a capillary with an inside diameter of about 0.0055 inch with a length of about 2.25 inches most nearly approaches this condition.

This preferred capillary has the properties that for a gasoline which has a Reid Vapor Pressure of 9 pounds and a pressure of approximately 20.5 p. s. i. a. in the chamber it allows approximately 60 cc. per minute of vapors (measured at standard conditions) to escape from the chamber and that for a gasoline which has a Reid Vapor Pressure of 15 pounds and a pressure of approximately 32 p. s. i. a. in the chamber it allows approximately 120 cc. per minute of vapors (measured at standard conditions) to escape from the chamber.

Figure 3:
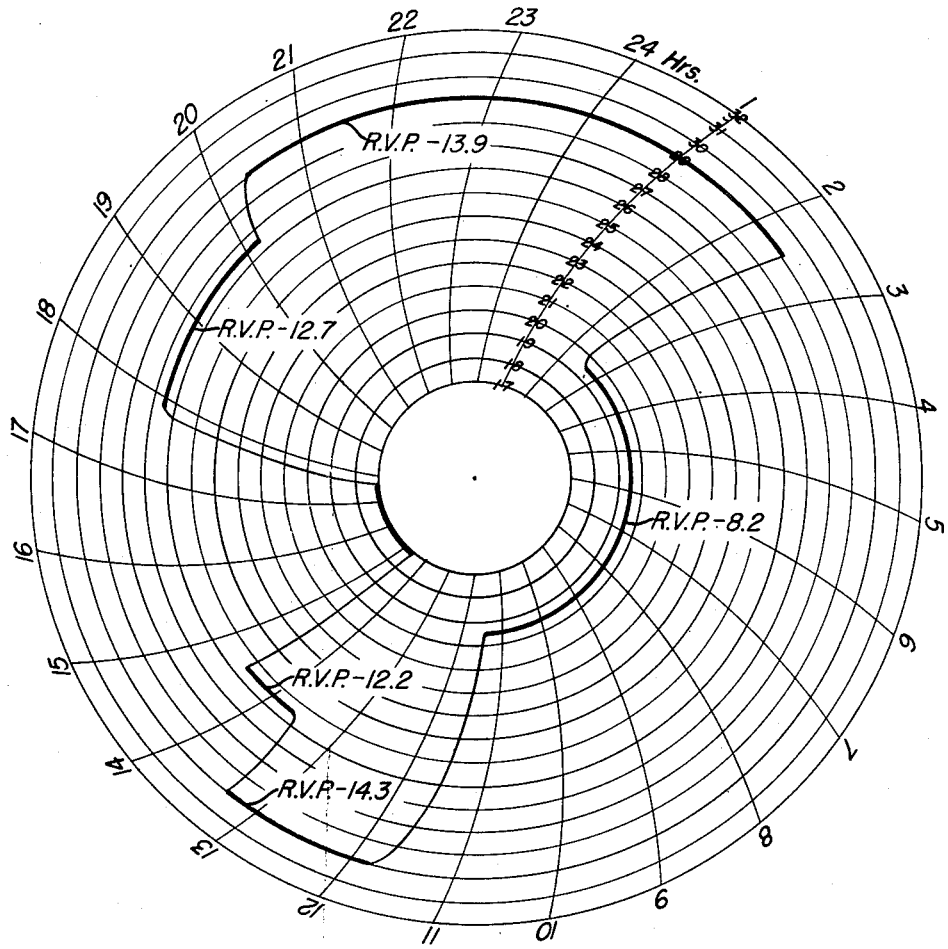
Figure 3 is a representation of the recorder chart showing the results obtained in a continuous gasoline blending operation.
Figure 5:
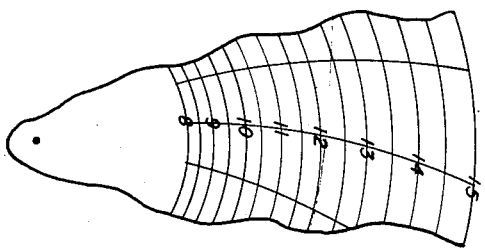
Figure 5 illustrates a scale for direct reading of Reid Vapor Pressure on the described instrument.

An example of operation of the illustrated apparatus in its application to gasoline blending is represented by the chart in Figure 3 which illustrates an actual record obtained over a period of 24 hours during which the instrument indicated Reid Vapor Pressure of from 8.2 to 14.3 pounds. The original record shows chamber pressures and these were converted by means of the calibration curve in Figure 4. However, a special chart and scale based on the calibration curve of Figure 4 can be applied to the gauge 18 and recorder 28 whereby Reid Vapor Pressure of a sample can be read and recorded directly. Such a chart or scale is shown in Figure 5.

Figure 4:
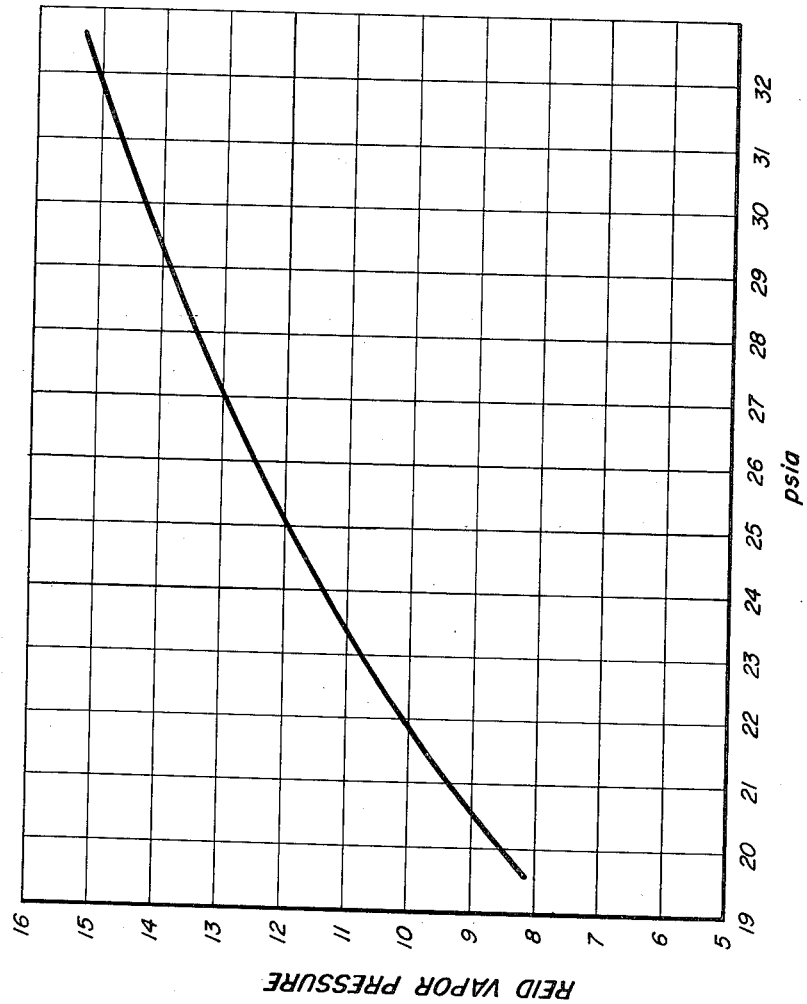
Figure 4 is a calibration curve which may be used in conjunction with the chart in Figure 3.

The data for the calibration curve of Figure 4 were obtained at a bath temperature of 140° F. with a liquid flow of gasoline of known vapor pressure at a rate of 60 cc. per minute. The venting capillary used as a standard in obtaining these data permitted a flow of 190 cc. of nitrogen per minute at 20° C. with a pressure drop of 35 p. s. i. across it. This corresponds to 60 cc. of 9 pound Reid gasoline vapor per minute at 140° F.

In a typical test during gasoline blending a liquid sample of the blended gasoline is introduced by metering pump 5 into the preheater tube 10 at a rate of about 60 cc. per minute and passed through the preheater tube 10 comprised of a stainless steel tube 8 feet long and ⅛ inch O. D. (0.061 inch I. D.). A venting capillary 20 comprised of a glass tube about 2.25 inches long with a bore diameter of about 0.0055 inch may be used and the rate of discharge through such a capillary vent 20 will be found with a 9 pound Reid gasoline to be about 60 cc. of vapor per minute. Liquid gasoline is continuously withdrawn under control of the float valve mechanism within the chamber 12 at a rate of approximately 60 cc. of liquid per minute. Thus, the amount of stripping resulting from the venting of the vapors is minimized and is at a controlled and uniform rate to give a pressure recording characteristic of the gasoline blend under test.

When the chamber pressure is applied to a recording-proportioning controller 28, it can be used to control the setting of blending valve 29 so as to maintain the production of the desired blend having the selected Reid Vapor Pressure.

An example of operation of the present apparatus is its application to the problem of measuring small quantities of alcohol in water. When small percentages of alcohol are present in solutions containing unknown contaminants, for example, certain soaps, the determination of alcohol content by specific gravity measurement or by determination of the refractive index or dielectric constants becomes impossible or at best highly difficult. The apparatus of the present invention will measure the alcohol contents of such contaminated solutions. An apparatus similar to the type described in Figure 1 having a float valve 14 and inlet capillary 10 having a length of eight feet was employed. The capillary outlet 20 was thirty feet long. A constant temperature bath comprising a mixture of water and glycerine boiling at 102° C. provided a suitable constant operating temperature. The vessel containing the constant-temperature bath was fitted with a reflux condenser supplying total reflux to the boiling liquid.

Figure 2:
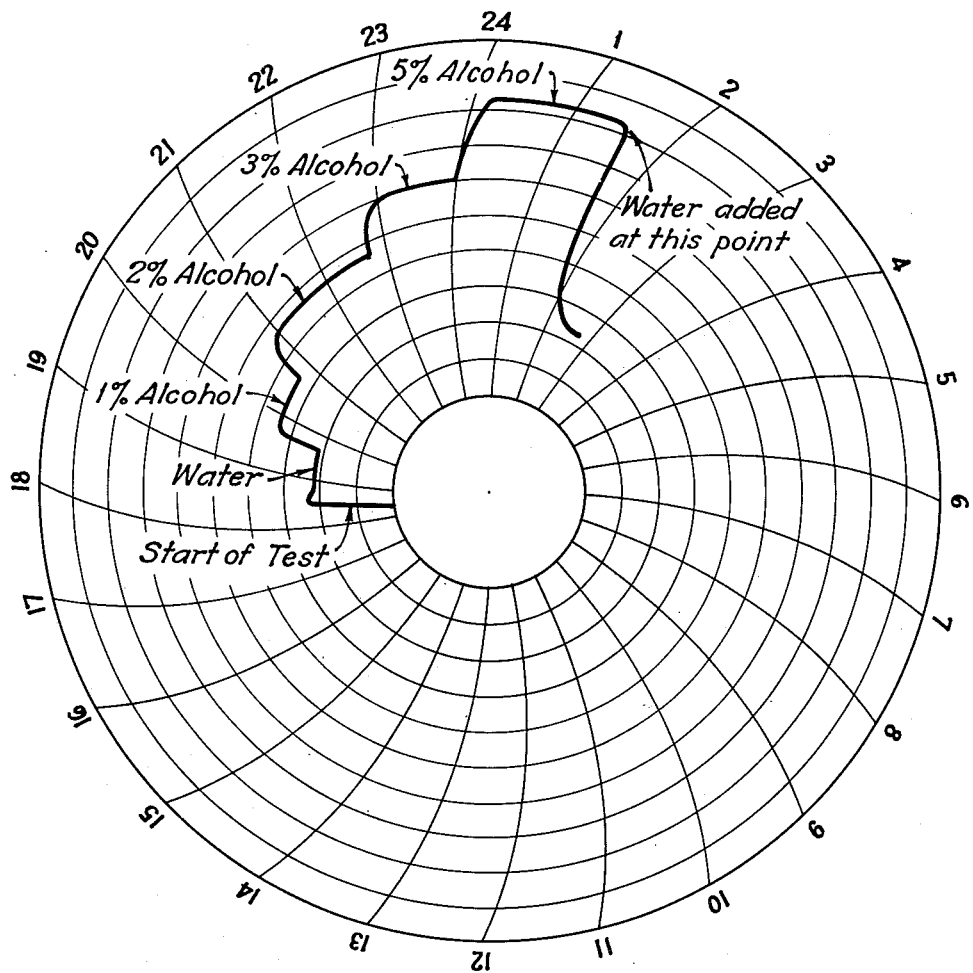
Figure 2 is a representation of a recorder chart showing results provided by one application of the apparatus of the invention.

Alcohol-water solutions were fed into the eight foot capillary under pressure of 7.5 pounds per square inch and at a rate of approximately one gallon per hour, were flowed therefrom into the vapor chamber at an established equilibrium temperature of 102° C. and the solutions were discharged from the chamber by action of the said float valve. Pressures developed in the vapor chamber were communicated to a recorder having a chart of which a part is shown in Figure 2. The five levels of the curve on the chart indicate that pressure which is exerted by water alone, water containing 1% alcohol, 2% alcohol, 3% alcohol and .5% alcohol. It is noted that that reintroduction of pure water into the instrument created an abrupt break and that within about an hour the instrument had again reached equilibrium. It was found that the sensitivity of the apparatus is such that it will measure one-tenth percent of alcohol in water. As can be seen from the illustrated chart, the instrument will reach equilibrium in about 10 minutes after encountering a change in alcohol composition of approximately 1%.

As pointed out in the description of the apparatus, the capillary outlet for vapors in the vapor chamber will, of course, cause a reduction in the measured vapor pressure inasmuch as vapors are continuously permitted to flow through said outlet. In the specific example, hereinbefore given, the indicated pressure in excess of atmospheric is approximately two-thirds of the actual vapor pressure in excess of atmospheric. The bleeding off of vapor through the capillary outlet, therefore, accounts for a dynamic loss equal to the difference between the indicated and actual vapor pressures. However, in every instance the apparatus can properly be calibrated by the employment of known samples so that the actual vapor pressure can be read directly or the so-determined factor can be employed to correct the readings as there exists a substantially linear relationship between actual pressures and the readings obtained with the present apparatus.

An alternative apparatus within the scope of the present invention has been found particularly useful in the continuous recording of the vapor pressure of crude oils that vary rather considerably in their content of casinghead gasoline, butane, or like low boiling products. This apparatus comprises the said sample chamber 12 having a float valve and a constant temperature bath surrounding the chamber, an inlet feed line to which is attached a pressure gauge and which is provided with a preheater tube inlet which may be fed by a constant feed pump, a pressure recorder operatively connected to the said chamber, a float-controlled liquid outlet, and a capillary vapor outlet which in this modified example of the invention has disposed therein a thermal conductivity cell such, for example, as the one manufactured by the Gow-Mac Instrument Company of Newark, New Jersey, whereby the content of low boiling products in the sample can be determined. In an example of operation with this alternative apparatus samples of crude oils were fed to the apparatus under a pressure of approximately 30 pounds and through a capillary approximately 2 feet in length. The temperature of the bath was maintained at 55° C. Outlet vapors were fed to a capillary 125 feet in length and 0.030 inch in inside diameter. Vapor pressures between 6 and 26 pounds per square inch were determined. They were found to have a direct linear relationship to the Reid vapor pressures of the same samples. The thermal conductivity cell, operating in known manner, indicated the percentage of butane or casinghead gasoline appearing in the fixed gases flowing from the vapor chamber.

Another alternate apparatus employs an electrical heating unit of constant wattage input to supply heat directly to a thermally insulated vaporization zone and maintain substantially constant therein, an optimum temperature. This optimum temperature, as previously stated, is any selected temperature high enough to cause the tested liquids to exert a vapor pressure greater than the pressure at the outlet of the outlet capillary, but not higher than the critical temperature of the liquids.

This application is a continuation-in-part of our co-pending application S. N. 141,102 filed January 28, 1950, and entitled "Continuous Vapor Pressure Apparatus," now abandoned.

What we claim is:

1. A continuous volatility-determining instrument which comprises a float chamber having an opening at its lower part, a valve seat surrounding said opening, a valve member for engaging said seat and closing said opening, a float within said chamber connected to said valve member for moving said member toward and away from said seat, a metering pump discharging into said float chamber at a point above the liquid level maintained therein, said float controlled valve member and pump maintaining a constant liquid level in said float chamber substantially above said opening, a preheater tube through which said metering pump discharges liquid into said float chamber, said preheater tube having an inside diameter sufficiently small to minimize any tendency for separation of vapor and liquid during preheating of a metered sample and having a length sufficient to bring said metered liquid sample to a controlled uniform temperature at a defined flow rate, a capillary vent from an upper part of said float chamber and communicating therewith substantially above said float, said capillary vent having an inside diameter in the range of about 0.005 inch to 0.03 inch and having a length sufficient to allow a flow of about 200 cc. per minute of nitrogen measured at standard conditions with a pressure drop of 35 pounds p. s. i. across the capillary at a temperature of about 20° C., a constant temperature bath substantially surrounding said preheater tube, said float chamber and said capillary vent tube, and a pressure indicator communicating with said float sample below the liquid level therein as determined by said float.

2. The instrument of claim 1 wherein the preheater tube has an inside diameter of between about 0.05 inch and 0.2 inch and a length of between about 4 feet and 10 feet, and said capillary vent has a length in the range of about 2.25 inches to about 125 feet the larger diameter corresponding to the greater length.

3. The instrument of claim 1 wherein said preheater tube has an inside diameter of about 0.06 inch and a length of about 8 feet and said capillary vent has an internal diameter of about 0.0055 inch and a length of about 2.25 inches.

4. Apparatus for continuously determining the volatility characteristics of a flowing liquid stream which apparatus comprises a metering device for withdrawing an aliquot portion of said flowing stream at a substantially constant rate and pressure to form a sample stream, a constant temperature bath, a float chamber within said bath, a preheater tube connected from the metering device to the float chamber and immersed in said bath, said preheater tube being of a length and size to bring the sample stream substantially to the temperature of said bath without appreciable vapor separation at the flow rate provided by the metering device, a valve in the lower part of said float chamber and a float operatively connected to said valve for maintaining a substantially constant liquid level in said chamber, a liquid discharge line leading from said valve for discharging liquid at substantially the same rate as it is introduced, a capillary tube connected to the chamber above the liquid level therein and immersed in said bath and a pressure gauge connected to said chamber, said capillary tube being of such size and length as to effect discharge of a gasiform stream at a volumetric rate which is approximately .1 to 3 times the volumetric rate at which the liquid sample stream is introduced by the metering device under the pressure differential between said metering device and the outlet of said capillary tube.

5. Apparatus for continuously determining the volatility characteristics of a flowing liquid stream of gasoline which apparatus comprises a metering device for withdrawing an aliquot portion of said flowing stream at a substantially constant rate and pressure to form a sample stream, a constant temperature bath, a float chamber within said bath, a preheater means connected from the metering device to the said chamber and including a tube immersed within said bath, said tube being of a length and size to bring the sample stream substantially to the temperature of said bath without appreciable vapor separation at the flow rate provided by the metering device, a filter interposed said metering device and preheater tube whereby foreign material is removed from the flowing stream, a valve in the lower part of said chamber and a float operatively connected to said valve for maintaining a substantially constant liquid level in said chamber, a liquid discharge line leading from said valve for discharging liquid therefrom, a capillary tube connected to the said chamber above the liquid level therein and immersed in said bath, a vent conduit receiving the flow from said capillary tube and discharging the flow exterior of said bath, and a pressure gauge connected to said chamber, said capillary tube being of such size and length as to permit discharge of vapors of an approximately 9-pound Reid gasoline at a volumetric rate which is approximately .1 to 3 times the volumetric rate at which the liquid stream is introduced by the metering device under the pressure differential between said metering device and the outlet of said capillary tube.

6. The apparatus of claim 5 wherein the capillary tube is characterized by discharging about 60 std. cc. per minute of 9-pound Reid gasoline vapors at 140° F.

7. Apparatus for determining volatility characteristics of gasoline which comprises means for maintaining a constant volume pool of liquid gasoline at a constant depth within an enclosed chamber of greater volume than said pool, means for maintaining therein a substantially constant temperature of between about 135 and 145° F. sufficient to generate in said chamber a superatmospheric pressure due to gasoline vapors, the volume of said enclosed chamber being sufficient to accumulate a mass of gasoline vapors above said pool, metering means for continuously adding additional amounts of liquid gasoline to the pool in said chamber at a substantially constant rate of about 60 cc. per minute, means for pre-heating the additional amounts of liquid gasoline to a substantially constant temperature corresponding to the temperature of the liquid in said pool, means for continuously removing from said chamber above said confined pool of liquid a restricted stream of vapors, and means for determining the absolute pressure in said chamber as a measure of a volatility characteristic of the gasoline sample, said means for continuously removing vapors from the chamber comprising a capillary tube of such size and length as to permit discharge of vapors of an approximately 9-pound Reid gasoline at a volumetric rate which is approximately .1 to 3 times the volumetric rate at which the liquid gasoline is introduced into the chamber under the pressure differential between said metering means and the outlet of said capillary tube.

8. An apparatus for continuously determining volatility characteristics of a flowing liquid hydrocarbon stream containing butane which apparatus comprises metering means for continuously withdrawing an aliquot portion of such stream at a constant predetermined rate, conduit means for flowing a sample liquid stream from said metering means, means for maintaining said conduit means at a predetermined temperature of between about 135 and 145° F., said conduit means discharging into a vapor separation chamber, means for maintaining the said vapor separation chamber at said predetermined temperature, means for withdrawing sample liquid from said separation chamber at substantially the same rate as said constant predetermined rate to maintain a substantially constant liquid level in said separation chamber, means for withdrawing vapors from said separation chamber above said liquid level comprising a capillary of great length relative to its cross-sectional flow area, said capillary being characterized by having a size and length to permit discharge of vapors of approximately 9-pound Reid gasoline at a volumetric rate which is approximately .1 to 3 times the volumetric rate at which the liquid stream is introduced by the metering means under the pressure differential between said metering means and the outlet of said capillary, means for maintaining said capillary at said predetermined temperature, and means for measuring the pressure within said separation chamber as an indication of the vapor pressure of the flowing liquid stream.

References Cited in the file of this patent

UNITED STATES PATENTS

| | | |
|---|---|---|
| 2,002,101 | Valby et al. | May 21, 1935 |
| 2,119,786 | Kallam | June 7, 1938 |
| 2,671,340 | Jacobs et al. | Mar. 9, 1954 |